United States Patent
Refke et al.

(10) Patent No.: US 8,628,860 B2
(45) Date of Patent: Jan. 14, 2014

(54) THERMAL SPRAYING MATERIAL, A THERMALLY SPRAYED COATING, A THERMAL SPRAYING METHOD AND ALSO A THERMALLY COATED WORKPIECE

(75) Inventors: Arno Refke, Mellingen (CH); Gerard Barbezat, Winterthur (CH); Jacobus Cornelis Doesburg, East Windsor, CT (US)

(73) Assignee: Sulzer Metco AG, Winterthur (CH)

( * ) Notice: Subject to any disclaimer, the term of this patent is extended or adjusted under 35 U.S.C. 154(b) by 624 days.

(21) Appl. No.: 11/601,285

(22) Filed: Nov. 17, 2006

(65) Prior Publication Data

US 2007/0116886 A1    May 24, 2007

(30) Foreign Application Priority Data

Nov. 24, 2005   (EP) ..................... 05405662

(51) Int. Cl.
*B05D 1/12* (2006.01)
*B05D 1/10* (2006.01)
*C22C 18/00* (2006.01)

(52) U.S. Cl.
USPC .......................................... 428/632

(58) Field of Classification Search
None
See application file for complete search history.

(56) References Cited

U.S. PATENT DOCUMENTS

| | | | | |
|---|---|---|---|---|
| 2,296,396 A * | 9/1942 | Miller | | 148/26 |
| 2,877,126 A * | 3/1959 | Whitby | | 106/403 |
| 3,434,813 A * | 3/1969 | Bomberger, Jr. | | 428/658 |
| 3,645,894 A | 2/1972 | Krystyniak | | |
| 4,193,822 A * | 3/1980 | Adam et al. | | 148/549 |
| 4,269,867 A * | 5/1981 | Altorfer et al. | | 427/564 |
| 4,515,866 A * | 5/1985 | Okamoto et al. | | 428/614 |
| 4,861,679 A * | 8/1989 | Guerriero et al. | | 428/614 |
| 4,915,906 A | 4/1990 | Champagne et al. | | |
| 4,977,947 A * | 12/1990 | Boswell et al. | | 164/71.1 |
| 5,034,283 A * | 7/1991 | Lhymn et al. | | 428/614 |
| 5,223,347 A * | 6/1993 | Lhymn et al. | | 428/614 |
| 5,279,809 A * | 1/1994 | Kitano et al. | | 423/622 |
| 5,358,753 A | 10/1994 | Rao et al. | | |
| 5,679,167 A | 10/1997 | Muehlberger | | |
| 6,117,574 A * | 9/2000 | Watanabe et al. | | 428/698 |
| 6,187,116 B1 * | 2/2001 | Gilles | | 148/441 |
| 7,449,249 B2 * | 11/2008 | Barbezat | | 428/674 |
| 2001/0029095 A1 * | 10/2001 | Tadauchi et al. | | 438/612 |
| 2004/0253382 A1 | 12/2004 | De Bosscher et al. | | |

FOREIGN PATENT DOCUMENTS

| | | | |
|---|---|---|---|
| EP | 0167723 A1 | | 1/1986 |
| EP | 407596 A1 | * | 1/1991 |
| JP | 59066468 A | * | 4/1984 |
| JP | 01052051 | | 2/1989 |
| JP | 03238619 A | * | 10/1991 |
| JP | 9-273893 A | | 10/1997 |
| JP | 10-204601 A | | 8/1998 |
| JP | 2001-131701 A | | 5/2001 |
| JP | 2002-361405 A | | 12/2002 |
| JP | 2004-346417 A | | 12/2004 |
| WO | WO 98/37252 A1 | | 8/1998 |

OTHER PUBLICATIONS

Japanese Office Action mailed on Sep. 4, 2012 for JP Patent Application No. 2006-302463, English Translation, 2 pages.

* cited by examiner

*Primary Examiner* — David Sample
*Assistant Examiner* — Adam Krupicka
(74) *Attorney, Agent, or Firm* — Kilpatrick Townsend & Stockton LLP

(57) ABSTRACT

The invention relates to a thermal spraying material (5) for the coating of a surface of a workpiece by means of a thermal spraying method, wherein the spraying material (5) contains zinc. The invention further relates to a thermal spraying method and to a thermally sprayed coating sprayed with the material (5).

39 Claims, 2 Drawing Sheets

THERMAL SPRAYING MATERIAL, A THERMALLY SPRAYED COATING, A THERMAL SPRAYING METHOD AND ALSO A THERMALLY COATED WORKPIECE

BACKGROUND OF THE INVENTION

The invention relates to a thermal spraying material, to the use of a material for the coating of a surface of a workpiece by means of a thermal spraying method, to a thermally sprayed coating, to a thermal spraying method and also to a thermally coated workpiece.

The coating of surfaces of the most diverse workpieces has an almost incalculable number of uses in industrial technology and a correspondingly high economic significance. In this connection coatings can be advantageously applied to the most diverse substrates for very different reasons. Wear protection coatings on mechanically heavily loaded parts such as, for example, on running surfaces of cylinders or piston rings of combustion engines or compressors, play an important role for example. In addition to wear resistance further demands are made on these parts, such as good sliding characteristics, i.e. good tribological characteristics or also excellent dry operation characteristics. Different thermal spraying methods have in particular proved to be excellent for such requirements and similar ones, above all the known plasma spray methods.

Coatings manufactured by arc vaporization, PVD or CVD processes have been used successfully for the production of hard layers on highly loaded tools, primarily chip-forming tools such as milling cutters, drills, etc. However, precisely the application of the last-named processes is very widespread in completely different fields, for example for the coating of jewelry or clock housings or for the application of protective coatings or simply for the embellishment of basic commodities.

Other methods, such as for example gas nitriding, are well-established methods which are of great significance in corrosion protection, among other things.

In this connection the coating of workpieces with very large surface areas, such as metal sheets for example, which have to be protected against corrosion among other things, is fundamentally problematic. Metal sheets of this kind or other substrates are, for example, provided on rolls of a substantial width of up to a few meters and in a length of up to several hundred meters or even more.

An established technique for the coating of sheets of this kind is galvanic or electrolyte deposition, for example. Thus, it is known, for example, to provide large steel sheets with a corrosion protection layer made of Zn and Mg. In a typical known process a 1 µm to 30 µm thick layer made of pure zinc (Zn) is applied in a first step electrolytically or galvanically onto a metal sheet which can be, for example, made of steel, of aluminum, of another metal or of a metal alloy. The surface of this first layer is then subjected to a cleaning process by means of ultrasound and/or PVD sputtering for example. After this a thin layer approximately 0.1 µm to 0.5 µm thick, made of pure magnesium (Mg), is applied to the first zinc layer by means of a PVD method. Finally, a heat treatment of the workpiece takes place for example for 10 minutes to 3 hours, at 200° C. to 550° C. for example, in very special cases up to 650° C., through which diffusion processes are initiated, so that $MgZn_2$ phases can form on the surface of the originally pure Mg layer, through which an improved protection against corrosion is attained.

The workpieces treated in this way have clearly improved corrosion characteristics in comparison to workpieces with pure zinc layers and can also be worked better because the combination layers as a whole have a reduced thickness. However, the above-described four-stage coating process is extraordinarily time-consuming and above all requires the combination of completely different methods, so that not only the carrying out of the coating process as such but also machinery cost is enormous, so that the costs for the manufacture of these corrosion protection layers are basically unreasonably high.

For these reasons alternatives have been sought for a long time, with thermal spraying in its different variants basically coming into question, primarily because thermal spraying has long been established in the series production of individual parts and industrial series production. The most usual thermal spraying methods, which are also used in particular in series production for the coating of the surfaces of substrates in large numbers, are, for example, flame spraying with a spraying powder or a spraying wire, arc spraying, high velocity flame spraying (HVOF), flame detonation spraying or plasma spraying. The above-named list of thermal spraying methods is certainly not exhaustive. On the contrary the person averagely skilled in the art is familiar with a large number of variations of the listed methods, and also further methods, for example special methods such as flame spraying welding. The so-called "cold gas spraying" also has to be mentioned in this connection. Although, strictly speaking, it is not to be counted as one of the thermal spraying methods, within the context of this application the known "cold gas spraying method" (cold spraying) is also understood to be covered by the term "thermal spraying method" in addition to all known spraying methods.

In this connection thermal spraying has opened up large areas of use. One can certainly state that thermal spraying as a surface coating technique is the coating technique which probably has the largest scope of use. A delimitation of the areas of use of the spraying methods listed above does not appear necessarily sensible in this connection because the areas of use can overlap with each other.

It was a great problem for a long time in this connection to provide large surface areas in sufficient uniformity, in particular with thin layers with thickness in the micrometer range by means of thermal spraying methods. The low pressure thermal method ("LPPS method") suggested in EP 0776 594 B1 has brought about a breakthrough here, which, using a broad/wide plasma beam, allows the manufacture of uniform coatings on large surfaces, on metal sheets for example. On the one hand this is achieved by means of the geometric design of the spray gun, with it moreover being important that a substantial pressure difference prevails between the inside and the outside of the spray gun. The workpiece, or at least the surface area of the workpiece, which is to be coated is located in a coating chamber in this arrangement, in which, in relation to the inside of the spray gun, a sub-atmospheric pressure is produced, for example a sub-atmospheric pressure of less than 100 mbar, while in the spray gun a pressure of approximately 1000 mbar prevails, in other words approximately ambient pressure. A broad coating beam can be produced by setting a pressure gradient of this kind between the inside of the spray gun and the coating chamber, by means of which the surface of the workpiece can be coated with a uniformity never previously attainable.

In this connection this basic principle has in the meantime been developed considerably further. EP 1 479 788 A1 shows for example a hybrid method which builds on the basic method of EP 0776 594 B1.

In this connection these methods are particularly suitable to apply different metallic or non-metallic coatings, in particular also ceramic, carbidic or nitridic layer components, in thin layers.

Modern technical demands however are moving toward the replacement of even the multi-stage galvanic or electrolytic method described above with reference to an exemplary process by thermal spraying methods, since the thermally sprayed layers can be applied principally in one method step and much more efficiently, in other words with clearly higher deposition rates, i.e. in a much shorter time.

In this connection one has hitherto been of the opinion that the classic thermal spraying methods, in particular the LPPS method outlined briefly above and also the cold gas spraying method, are fundamentally not suitable for coating with zinc and zinc compounds. The reason for this view is that zinc has an enormously high vapor pressure even at relatively low temperatures. Thus zinc for example already has a vapor pressure of approximately 1000 mbar at approximately 900° C., while aluminum only reaches roughly the same vapor pressure at approximately 2000° C. and $Al_2O_3$ only displays it at about 3000° C.

Thus one has assumed up to now that the LPPS method is not worth considering for the thermal spraying of zinc-containing layers, primarily, but not only, because it was presumed that due to its high vapor pressure the zinc already escapes in the coating beam to such a large extent that no useful zinc-containing layers can be manufactured by means of thermal spraying. In this connection not only is the high vapor pressure of the zinc as such regarded as a fundamental problem, but also the large difference in the vapor pressure from other materials, which can be sprayed at the same time as the zinc. If a different material is sprayed simultaneously together with zinc, which is for example separately sprayed simultaneously with zinc, but at a considerably lower vapor pressure, then it has to be feared that already the ratio of the composition of zinc to further spraying materials will massively alter the coating beam, so that the sprayed layers no longer have the desired composition and thus the necessary corrosion protection cannot be attained.

Accordingly, no suitable zinc-containing spray materials and consequently also no corresponding thermal spraying methods exist in the prior art.

SUMMARY OF THE INVENTION

Thus an object of the present invention is to make available a thermal spraying method, so that thermally sprayed surfaces can be manufactured by means of a thermal spraying method, which offer at least a corrosion protection which is at least equally good in comparison with the conventional layers, for example galvanically applied layers. Furthermore, it is an object of the invention to make available a thermal spraying method with which a corresponding surface layer can be manufactured.

The invention thus relates to a thermal spraying material for the coating of a surface of a workpiece by means of a thermal spraying method, wherein the spraying material contains zinc.

Thus, it is fundamental to the spraying material in accordance with the invention that it contains zinc. The presence of zinc in a coating sprayed with the spraying material guarantees, possibly with the addition of further suitable elements, that the workpiece provided with the zinc coating, for example a sheet made of steel, aluminum or another suitable metal or a suitable metal alloy, is optimally protected against corrosion. The fact that the spraying material in accordance with the invention can be used at all for a thermal spraying method is due to the recognition that by a suitable selection of the coating parameters, which is described in more detail below, the spraying of materials with high vapor pressure is possible, even in combination with other materials which have a considerably lower vapor pressure.

In a preferred embodiment the spraying material is a zinc alloy and/or a intermetallic compound and/or a metallic compound and/or a non-metallic compound of the kind Zn—X, wherein X is at least a metallic or a non-metallic component, Zn is contained in the range of 70% by weight to 100% by weight, preferably with more than 80% by weight, and wherein X is at least one element from the group comprising of the elements Sn, Mg, Ca, Al, Fe, Ni, Co, Cu, Mo, Ti, Cr, Zr, Y, La, Ce, Sc, Pr, Dy, C, O, N, and in particular a MCrAlY alloy, wherein M=Ni, Co, CoNi or Fe.

The combinations of the elements Cu, Ni, Co, Mo play a special role in this, which among other things, but not just, have an influence on the toughness of the layer to be sprayed.

In an embodiment which is particularly important for practical use, tin (Sn) is contained in the spray powder as an alloying element with a proportion of up to 10% by weight, in particular up to 5% by weight, especially between 1% and 4% by weight. Among other things a strengthened bond between the zinc (Zn) particles can be attained during the diffusion by the addition of Sn. A eutectic for example, with a melting point of approximately 200° C., can formed about the Sn particles, which can considerably accelerate the diffusion during the heat treatment. This point will be explained again later in context in the description of the method in accordance with the invention. In order to achieve the described effect, it is particularly advantageous when the starting material Zn is already alloyed prior to the spraying, in other words is alloyed with Sn in the spray powder itself.

In another embodiment the spraying material can include an Mg-Zn alloy, in particular $MgZn_2$ and/or a $ZnAl_a$ alloy, in particular with $1\% \leq a \leq 10\%$ by weight, especially with $4\% \leq a \leq 6\%$. In this connection the alloying with Al leads on the one hand to the melting point of the alloy being reduced and to the vapor pressure of pure zinc being simultaneously reduced.

In particular, for the increase of the hardness and/or of the wear protection characteristics of a coating which is to be sprayed, but not only for this purpose, a spraying material in accordance with the invention can include an oxidic component and/or a ceramic component, in particular MgO and/or $Al_2O_3$, and/or a carbide, in particular SiC, and/or a nitride, in particular AlN, and/or can contain a compound of the type $M_xO_yN_z$, wherein M is a metal, in particular Zr, Al, Cr, Ti, Ta or another material which forms a thermodynamically stable compound of this type. In this connection the resistance to scratches of the surface is in particular increased by the addition of the hard ceramic materials.

In this connection the possible additional components in the spraying material are of course dependent on the application in which a workpiece to be coated is to be employed. The spraying material is preferably no longer an homogenous alloy but rather a compound material, for example a finely agglomerated material with a particle diameter from the nanometer range up to and into the micrometer range.

Furthermore, the invention relates to a thermally sprayed coating on a surface of a workpiece, wherein the surface layer contains zinc.

In this connection the coating can include pure zinc, a zinc alloy and/or an intermetallic compound and/or a non-metallic composite of the kind Zn—X, wherein X is at least a metallic or a non-metallic component, Zn is contained in the range of 70% by weight to 100% by weight, preferably with more than 80% by weight, and wherein X is at least one element from the group comprised of the elements Sn, Mg, Ca, Al, Fe, Ni, Co, Cu, Mo, Ti, Cr, Zr, Y, La, Ce, Sc, Pr, Dy, C, O, N, and in particular a MCrAlY alloy, wherein M is equal to Ni, Co, CoNi or Fe.

In an embodiment which is particularly important for practical use, the thermally sprayed coating contains tin (Sn) with a proportion of up to 10% by weight, in particular up to 5% by weight, especially between 1% and 4% by weight as an alloying element in the surface layer. As has already been mentioned, a strengthened connection between the zinc (Zn) particles can be attained in the diffusion process by the addition of Sn. For example, a eutectic with a melting point of approximately 200° C. can form about the Sn particles, which can considerably accelerate the diffusion during a heat treatment which is possibly carried out after the application of the coating. In order to achieve the described effect it is particularly advantageous if the starting material Zn is already alloyed with Sn prior to spraying, in other words is already alloyed with Sn in the spray powder itself.

In another embodiment of a thermally sprayed coating in accordance with the invention the coating includes a Mg—Zn alloy, in particular $MgZn_2$ and/or a $ZnAl_a$ alloy, in particular with 1%≤a=≤10% by weight, especially with 4%≤a≤6%, and/or the coating contains an oxidic component and/or a ceramic component, in particular MgO and/or $Al_2O_3$, and or a carbide, in particular SiC, and/or a nitride, in particular AlN. In this connection the alloying of Al leads, on the one hand, as already mentioned, to the melting point of the alloy being reduced and simultaneously to the vapor pressure of pure zinc being reduced.

The coatings with oxidic and/or carbidic and/or ceramic components are distinguished in particular by a high degree of hardness and/or a good resistance to wear. In the case of these hard layers containing for example SiC or AlN, or other components of these material classes, the addition or doping with relatively small amounts can have a considerable influence on the corresponding characteristics. By this means the cohesion between the particles is improved in particular and/or the columnar construction of the crystal structure in the coating is assisted.

In another example, the spraying material contains a compound of the type $M_xO_yN_z$, wherein M is a metal, in particular Zr, Al, Cr, Ti, Ta or another material, which forms a thermodynamically stable compound of this type.

The thickness of the coating is preferably between 1 µm and 100 µm, in particular between 2 µm and 50 µm, especially between 2 µm and 20 µm, which is particularly advantageous for large metal sheets, such as are used in the automotive field, but not only there.

The invention further relates to a thermal spraying method for the formation of an above-described coating on a surface of a workpiece, wherein a spray material containing zinc in accordance with the present invention is used.

In this connection a workpiece to be coated is introduced into a process chamber or into a coating chamber and a gas atmosphere is adjusted to a predetermined gas pressure in the process chamber and the workpiece is coated with a coating beam at the predetermined gas pressure.

In this connection a gas pressure of less than 100 mbar is preferably set in the process chamber, preferably a gas pressure between 1 mbar and 10 mbar, especially between 1 mbar and 2 mbar, and/or a medium spraying distance between 800 mm and 30000 mm, in particular between 1000 mm and 2000 mm, especially between 1000 mm and 1400 mm.

In an embodiment, which is particularly important for practical use of a method in accordance with the invention, a pressure ratio of 1 to 40, in particular of between 5 and 30, especially a pressure ratio of approximately 10 to 20, is set between a pressure in the interior of the coating beam and the gas pressure of the gas atmosphere. In other words a gas pressure of the gas atmosphere is preferably selected which is less than the pressure in the interior of the coating beam, for example in a plasma beam at the outlet of the spray gun. This selection of the pressure parameters is also termed an "underexpanded condition". The selection of these parameters is in particular very advantageous when the spray material contains a material which vaporizes easily, in other words has a high vapor pressure for example.

It has been shown that shock-like waves or conditions form in a coating beam, which for example diverges supersonically, which form a barrier for the material located in the coating beam, so that essentially it cannot escape from the coating beam. This means that the beam functions in the same way as a light conductor for light, as a totally reflecting barrier, so that the vaporized material is trapped in the coating beam and thus materials with a high vapor pressure can also be sprayed. This effect is aided by the fact that a quasi-laminar flow is present in the marginal zone of a thermal coating beam, i.e. that the turbulence is greatly reduced in this marginal zone.

In this connection a pressure gradient of 0.001 mbar/mm to 0.02 mbar/mm, in particular from 0.0005 mbar/mm to 0.01 mbar/mm, is particularly advantageously set, seen along the length of the coating beam.

It is to be understood that not only solid, liquid and gaseous, in other words vaporized, components can be contained in the coating beam. A combination of liquid components and gaseous components in particular leads to particularly advantageous coatings. For the deposition of vaporized materials it is particularly important that a clean surface of the workpiece is available. Hot, substantially liquid zinc droplets on the surface of a oxide-containing substrate can react with the oxide and then adhere very well, so that essentially liquid droplets, particularly of zinc, are very advantageous for the adhesion of the coating which is to be built up, at least for the formation of those parts of coating which are in direct contact with the surface of the substrate.

The temperature of the workpiece is advantageously adjusted to a predetermined value during coating, in particular to a temperature between room temperature and 550° C., especially to a temperature between room temperature and 400° C.

After coating, the coated workpiece can, if necessary, be further heat treated at a predetermined temperature, in particular at a temperature between 400° C. and 650° C., especially at approximately 550° C. In this connection the heat treatment can, among other things, lead to a homogenizing and/or densification of the sprayed-on coatings, can improve the bonding of the coating to the substrate, can decrease the surface roughness and/or can lead to the formation of preferred oxides or metallic and/or non-metallic compounds, which can positively influence the corrosion resistance, the resistance to wear or other physical or chemical characteristics of the coating, among other things.

In special cases it is also possible that additional protecting cover layers, in particular also organic cover layers, are applied, in particular with LPPS hybrid processes such as are described in EP 1 479 788 A1, so that for example coatings with optimal corrosion protection are produced on a workpiece.

Due to the fact that all process steps are preferably carried out simultaneously or one after the other in the process chamber, no oxidic contaminants arise, which facilitates a simple carrying out of the process and leads to a better diffusion, both in and between the particles and also between adjacent layers. Very high surface regions which are obtained when thin layers are built up by more or less liquid droplets lead to lower sintering temperatures during the heat treatment and thus to thicker coatings.

Depending on the requirements it can be advantageous in this connection to undertake cleaning of the surface from organic and/or oxidic contaminants, before and/or during the coating process, preferably by means of arc cleaning or ablating.

It goes without saying that multi-layer systems, which are composed of individual layers of the same or different chemical and/or structural composition, can likewise also be applied to a workpiece, using a method in accordance with the invention. It goes without saying that gradient layers can also be produced, e.g. by altering method parameters during a coating process in a controlled fashion and/or by altering the composition of the spraying material.

Fundamentally, all thermal spraying methods known per se can be advantageously used for the carrying out of a method in accordance with the invention; i.e. the spraying method is a plasma spraying method, in particular a LPPS method, especially a LPPS thin film method, an HVOF method, a cold gas spraying method, a flame spraying method, especially a wire spraying or powder spraying method or another thermal spraying method, if only the parameters and spraying conditions are selected in accordance with the present invention.

As has already been mentioned several times, the invention further relates to the use of a material in accordance with the invention for the coating of a surface of a workpiece by means of a thermal spraying method.

Furthermore, the invention also relates to a workpiece, in particular to a large metal sheet, especially to a metal sheet made of aluminum and/or to iron and/or steel and/or to a metal and/or to a metal alloy and/or to another material, onto which a coating in accordance with the present invention is applied with a material in accordance with the invention. It is to be understood that a workpiece in accordance with the invention can also be coated on both sides.

BRIEF DESCRIPTION OF THE DRAWINGS

An important effect of a special embodiment of a method in accordance with the invention will be explained more closely in the following with the help of the drawings, which show.

DESCRIPTION OF THE PREFERRED EMBODIMENTS

Figure 1:
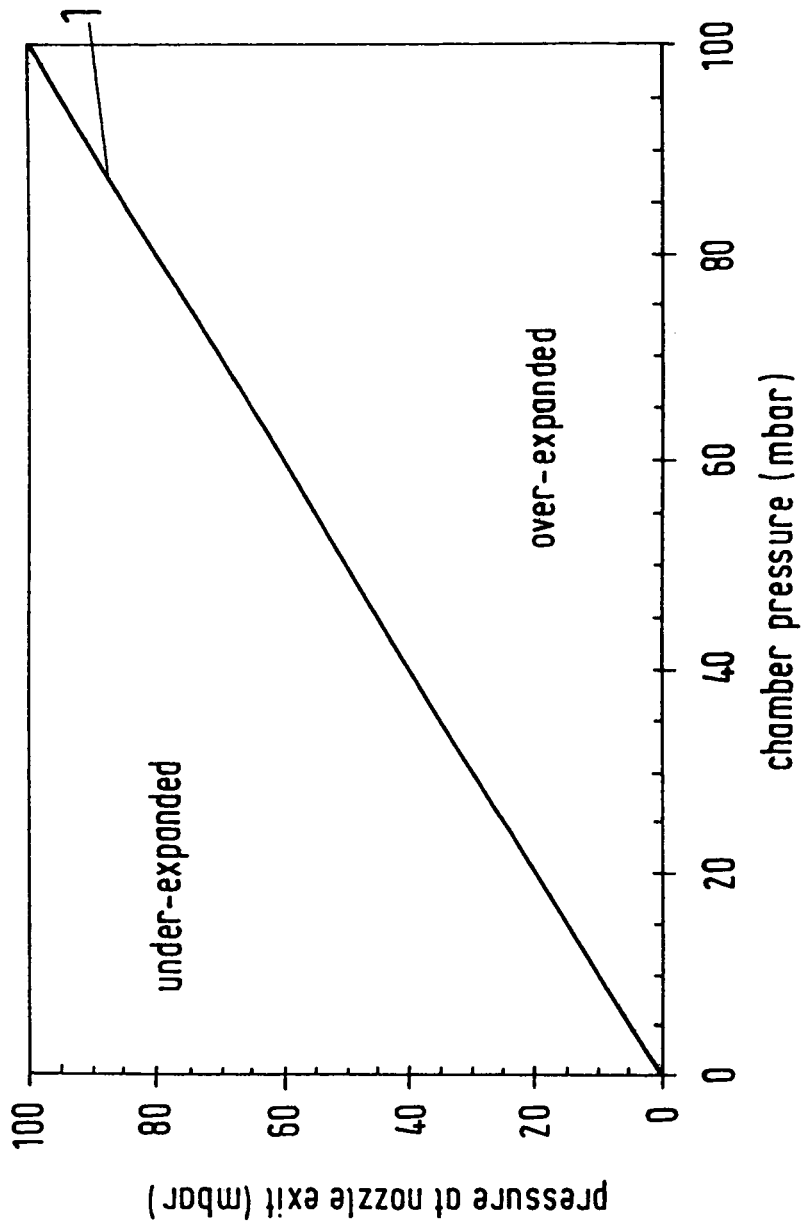
FIG. 1 is an under-expanded/over-expanded pressure diagram.

A diagram is illustrated in FIG. 1 in which pressure values are recorded on the ordinate, such as for example could arise during plasma spraying at the outlet 4 of a nozzle 3 of a spray gun 2, and, on the abscissa, gas pressures such as, for example, could be set in a process chamber during the coating of a substrate. In this connection, the separating line 1 separates the diagram into two-part regions, which are characterized with "under-expanded" and "over-expanded". In the under-expanded region, the pressure at the outlet 4 of the nozzle 3 is higher than the gas pressure in the process chamber. On the other hand, in the over-expanded part region, the gas pressure in the process chamber is higher than the pressure at the outlet 4 of the nozzle 3.

In carrying out of a method in accordance with the invention the pressure parameters are preferably selected so that coating takes place in the under-expanded region.

Figure 2:
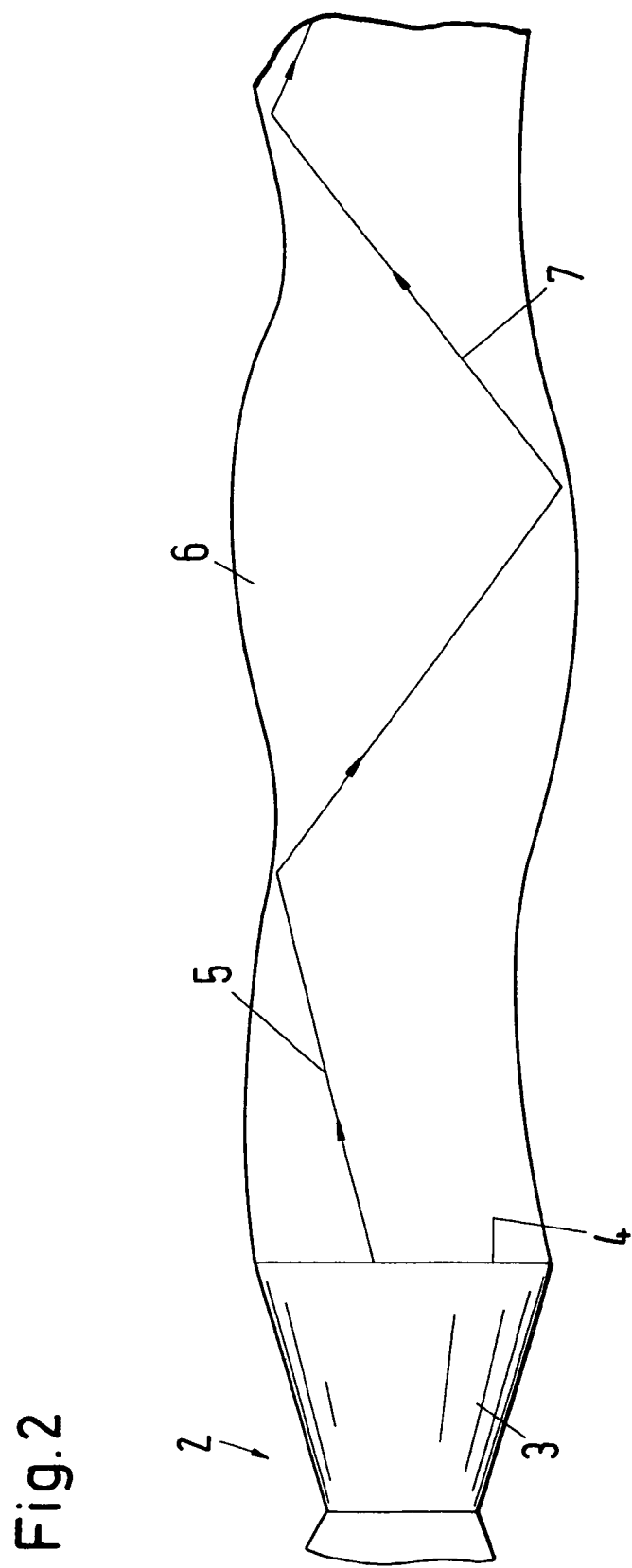
FIG. 2 shows the effect of the under-expanded condition on the flow of particles in the coating beam.

FIG. 2 shows in a schematic manner how the selection of the pressure parameters in the under-expanded region affects the movement of a spraying material 5 in a coating beam 6.

In FIG. 2 a section of a plasma spray gun 2 is schematically illustrated from which a coating beam 6 discharges from a nozzle 3. The coating beam 6 is ultrasonic so that shock waves form in the coating beam 6. The formation of the shock waves is illustrated symbolically by the wavelike outline of the coating beam 6. On the right-hand side in FIG. 2 there is a not-illustrated substrate, which is coated by the coating beam 6.

In the example of FIG. 2 a gas pressure of the gas atmosphere in the process chamber is selected, which is smaller than the pressure at the outlet 4 of the spray gun 2. This selection of the pressure parameters corresponds to the part region "under-expanded" in the diagram of FIG. 1. The selection of these parameters is, as has already been mentioned, particularly advantageous when the spray material 5 contains a material which vaporizes easily, in other words has a high vaporizing pressure.

The coating beam 6 of FIG. 2 spreads ultrasonically, so that shock-like waves or conditions form which represent a barrier for the material 5 located in the coating beam 6, so that this essentially cannot leave the coating beam 6. This means that the coating beam 6 has a similar effect to a light conductor for light, as a more or less totally reflecting barrier, so that the vaporized material is caught in the coating beam and, for example, follows the path 7 in the direction towards the substrate to be coated. For this reason it is possible to also coat materials with high vapor pressure, such as for example with Zn, using a method in accordance with the present invention.

In this connection it goes without saying that the invention is not limited to the described embodiments and, in particular, the embodiments in accordance with the invention described within the context of this application can, of course, also be combined in any suitable manner.

The invention claimed is:

1. A thermal spraying powder, consisting of one of a zinc alloy, an intermetallic compound, a metallic compound or a non-metallic compound, wherein the thermal spraying powder is of the kind Zn—X, wherein Zn is contained in the range of 70% by weight to less than 100% by weight, and wherein:
    X consists of two or more members selected from the group consisting of Sn, Mg, Ca, Fe, Ni, Co, Cu, Mo, Ti, Cr, Zr, Y, La, Ce, Sc, Pr, Dy, C, O, N, and compounds and combinations thereof;
        wherein a first one of the selected members is Sn in the amount of 1% to 4% by weight of the spraying powder; and
        wherein a second one of the selected members consists of at least one of an oxidic component or a ceramic component;
        wherein the at least one of the oxidic component or the ceramic component comprises at least one of MgO or carbide and further comprises a nitride.

2. A thermal spraying powder in accordance with claim 1, wherein the second one of the selected members consists of a ceramic component.

3. A thermal spraying powder, consisting of one of a zinc alloy, an intermetallic compound, a metallic compound or a non-metallic compound, wherein the thermal spraying powder is of the kind Zn—X, wherein Zn is contained in the range of 70% by weight to less than 100% by weight, and X consists of two or more members selected from the group consisting of Sn, Mg, Ca, Fe, Ni, Co, Cu, Mo, Ti, Cr, Zr, Y, La, Ce, Sc, Pr, Dy, C, O, N, and compounds and combinations thereof;
  wherein a first one of the selected members consists of Sn in the amount of 1% to 4% by weight of the spraying powder; and
  wherein a second one of the selected members consists of a compound of the type $M_aO_bN_c$, wherein M is selected from the group consisting of Sn, Mg, Ca, Fe, Ni, Co, Cu, Mo, Ti, Cr, Zr, Y, La, Ce, Sc, Pr, Dy, and C, wherein a, b, and c are positive integers.

4. A thermal spraying powder in accordance with claim 3 wherein $M_aO_bN_c$ is a thermodynamically stable compound.

5. A thermal spraying powder in accordance with claim 4, wherein M consists of Zr, Cr, Ti, or combinations or compounds thereof.

6. A thermal spraying powder, consisting of one of a zinc alloy, an intermetallic compound, a metallic compound or a non-metallic compound, wherein the thermal spraying powder is of the kind Zn—X, wherein Zn is contained in the range of 70% by weight to less than 100% by weight, and X consists of:
  Sn in the amount of 1% to 4% by weight of the spraying powder, and
  at least one member selected from the group consisting of Fe, Co, Cu, Mo, Ti, Zr, Y, La, Ce, Sc, Pr, Dy, C, O, N, and compounds and combinations thereof.

7. A thermal spraying method for the formation of a thermally sprayed coating on a surface of a workpiece, comprising spraying a powder on the surface of the workpiece, wherein the powder consists of one of a zinc alloy, an intermetallic compound, a metallic compound or a non-metallic compound, and is of the kind Zn—X, wherein Zn is contained in the range of 70% by weight to less than 100% by weight, and
  X consists of two or more members selected from the group consisting of Sn, Mg, Ca, Fe, Ni, Co, Cu, Mo, Ti, Cr, Zr, Y, La, Ce, Sc, Pr, Dy, C, O, N, and compounds and combinations thereof;
  wherein a first one of the selected members is Sn in the amount of 1% to 4% by weight of the spraying powder; and
  wherein a second one of the selected members consists of at least one of an oxidic component or a ceramic component;
  wherein the at least one of the oxidic component or the ceramic component comprises at least one of MgO or carbide and further comprises a nitride.

8. A thermal spraying method in accordance with claim 7, further comprising:
  putting a coated workpiece into a process chamber and adjusting a gas atmosphere, wherein adjusting the gas atmosphere comprises setting a pre-determined gas pressure in the process chamber; and
  coating the workpiece with a coating beam at the pre-determined gas pressure.

9. A thermal spraying method in accordance with claim 8, wherein a mean spraying distance is selected from the group consisting of: between 400 mm and 3000 mm, between 800 mm and 2000 mm, and between 1000 mm and 1400 mm.

10. A thermal spraying method in accordance with claim 8, wherein a ratio between a pressure in an interior of the coating beam and the pre-determined gas pressure is selected from the group consisting of: 1 to 40, 5 to 30, and 10 to 20.

11. A thermal spraying method in accordance with claim 8, wherein a pressure gradient over a length of the coating jet is selected from the group consisting of: 0.001 mbar/mm to 0.02 mbar/mm, and 0.005 mbar/mm to 0.01 mbar/mm.

12. A thermal spraying method in accordance with claim 7, wherein the pre-determined gas pressure is selected from the group consisting of: less than 100 mbar, between 1 mbar and 10 mbar, and between 1 mbar and 2 mbar.

13. A thermal spraying method in accordance with claim 7, further comprising setting a temperature of the workpiece at a pre-determined value during the coating.

14. A thermal spraying method in accordance with claim 13, wherein the pre-determined value of the temperature of the workpiece is selected from the group consisting of: between room temperature and 550° C., and between room temperature and 400° C.

15. A thermal spraying method in accordance with claim 7, further comprising heat treating the workpiece at a predetermined temperature after the coating.

16. A thermal spraying method in accordance with claim 15, wherein the predetermined temperature is selected from the group consisting of: between 400° C. and 650° C., and approximately 550° C.

17. A thermal spraying method in accordance with claim 7, wherein the spraying method is selected from the group consisting of a plasma spraying method, an LPPS method, an LPPS thin film method, an HVOF method, a cold gas spraying method, a flame spraying method, a wire flame spraying method, and a powder spraying method.

18. A thermal spraying method for the formation of a thermally sprayed coating on a surface of a workpiece, comprising spraying a powder on the surface of the workpiece, wherein the powder consists of one of a zinc alloy, an intermetallic compound, a metallic compound or a non-metallic compound, and is of the kind Zn—X, wherein Zn is contained in the range of 70% by weight to less than 100% by weight, and X consists of two or more members selected from the group consisting of Sn, Mg, Ca, Fe, Ni, Co, Cu, Mo, Ti, Cr, Zr, Y, La, Ce, Sc, Pr, Dy, C, O, N, and compounds and combinations thereof;
  wherein a first one of the selected members consists of Sn in the amount of 1% to 4% by weight of the spraying powder; and
  wherein a second one of the selected members consists of a compound of the type $M_aO_bN_c$, wherein M is selected from the group consisting of Sn, Mg, Ca, Fe, Ni, Co, Cu, Mo, Ti, Cr, Zr, Y, La, Ce, Sc, Pr, Dy, and C, wherein a, b, and c are positive integers.

19. A thermal spraying method in accordance with claim 18, further comprising:
  putting a coated workpiece into a process chamber and adjusting a gas atmosphere, wherein adjusting the gas atmosphere comprises setting a pre-determined gas pressure in the process chamber; and
  coating the workpiece with a coating beam at the pre-determined gas pressure.

20. A thermal spraying method in accordance with claim 19, wherein a mean spraying distance is selected from the group consisting of: between 400 mm and 3000 mm, between 800 mm and 2000 mm, and between 1000 mm and 1400 mm.

21. A thermal spraying method in accordance with claim 19, wherein a ratio between a pressure in an interior of the coating beam and the pre-determined gas pressure is selected from the group consisting of: 1 to 40, 5 to 30, and 10 to 20.

22. A thermal spraying method in accordance with claim 19, wherein a pressure gradient over a length of the coating jet is selected from the group consisting of: 0.001 mbar/mm to 0.02 mbar/mm, and 0.005 mbar/mm to 0.01 mbar/mm.

23. A thermal spraying method in accordance with claim 18, wherein the pre-determined gas pressure is selected from the group consisting of: less than 100 mbar, between 1 mbar and 10 mbar, and between 1 mbar and 2 mbar.

24. A thermal spraying method in accordance with claim 18, further comprising setting a temperature of the workpiece at a pre-determined value during the coating.

25. A thermal spraying method in accordance with claim 24, wherein the pre-determined value of the temperature of the workpiece is selected from the group consisting of: between room temperature and 550° C., and between room temperature and 400° C.

26. A thermal spraying method in accordance with claim 18, further comprising heat treating the workpiece at a pre-determined temperature after the coating.

27. A thermal spraying method in accordance with claim 26, wherein the predetermined temperature is selected from the group consisting of: between 400° C. and 650° C., and approximately 550° C.

28. A thermal spraying method in accordance with claim 18, wherein the spraying method is selected from the group consisting of a plasma spraying method, an LPPS method, an LPPS thin film method, an HVOF method, a cold gas spraying method, a flame spraying method, a wire flame spraying method, and a powder spraying method.

29. A thermal spraying method for the formation of a thermally sprayed coating on a surface of a workpiece, comprising spraying a powder on the surface of the workpiece, wherein the powder consists of one of a zinc alloy, an intermetallic compound, a metallic compound or a non-metallic compound, and is of the kind Zn—X, wherein Zn is contained in the range of 70% by weight to less than 100% by weight, and X consists of:
Sn in the amount of 1% to 4% by weight of the spraying powder, and
at least one member selected from the group consisting of Fe, Co, Cu, Mo, Ti, Zr, Y, La, Ce, Sc, Pr, Dy, C, O, N, and compounds and combinations thereof.

30. A thermal spraying method in accordance with claim 29, further comprising:
putting a coated workpiece into a process chamber and adjusting a gas atmosphere, wherein adjusting the gas atmosphere comprises setting a pre-determined gas pressure in the process chamber; and
coating the workpiece with a coating beam at the pre-determined gas pressure.

31. A thermal spraying method in accordance with claim 30, wherein a mean spraying distance is selected from the group consisting of: between 400 mm and 3000 mm, between 800 mm and 2000 mm, and between 1000 mm and 1400 mm.

32. A thermal spraying method in accordance with claim 30, wherein a ratio between a pressure in an interior of the coating beam and the pre-determined gas pressure is selected from the group consisting of: 1 to 40, 5 to 30, and 10 to 20.

33. A thermal spraying method in accordance with claim 30, wherein a pressure gradient over a length of the coating jet is selected from the group consisting of: 0.001 mbar/mm to 0.02 mbar/mm, and 0.005 mbar/mm to 0.01 mbar/mm.

34. A thermal spraying method in accordance with claim 29, wherein the pre-determined gas pressure is selected from the group consisting of: less than 100 mbar, between 1 mbar and 10 mbar, and between 1 mbar and 2 mbar.

35. A thermal spraying method in accordance with claim 29, further comprising setting a temperature of the workpiece at a pre-determined value during the coating.

36. A thermal spraying method in accordance with claim 35, wherein the pre-determined value of the temperature of the workpiece is selected from the group consisting of: between room temperature and 550° C., and between room temperature and 400° C.

37. A thermal spraying method in accordance with claim 29, further comprising heat treating the workpiece at a pre-determined temperature after the coating.

38. A thermal spraying method in accordance with claim 37, wherein the predetermined temperature is selected from the group consisting of: between 400° C. and 650° C., and approximately 550° C.

39. A thermal spraying method in accordance with claim 29, wherein the spraying method is selected from the group consisting of a plasma spraying method, an LPPS method, an LPPS thin film method, an HVOF method, a cold gas spraying method, a flame spraying method, a wire flame spraying method, and a powder spraying method.

* * * * *